UNITED STATES PATENT OFFICE.

RUPERT GREVILLE-WILLIAMS, OF ALBANY, NEW YORK, ASSIGNOR TO THE ALBANY COAL TAR DYE AND CHEMICAL COMPANY, OF SAME PLACE.

MANUFACTURE OF MIXED AZO COLORS.

SPECIFICATION forming part of Reissued Letters Patent No. 11,178, dated July 21, 1891.

Original No. 416,145, dated November 26, 1889. Application for reissue filed April 21, 1891. Serial No. 339,886.

*To all whom it may concern:*

Be it known that I, RUPERT GREVILLE-WILLIAMS, a citizen of Great Britain, and a resident of the city of Albany, in the county of Albany and State of New York, have invented certain new and useful Improvements in the Manufacture of Mixed Azo Colors; and I do hereby declare that the following is a full, clear, and exact description of the invention, which will enable others skilled in the art to which it appertains to make and use the same.

It is well known that insoluble "intermediate" bodies formed by the combination of one molecule of a tetrazo compound with one molecule of a naphthylamine or a sulpho-acid of a naphthylamine can be converted into soluble coloring-matter by reacting on them with another molecule of a different amine or with a phenol:

I have now found that a new class of intermediate bodies can be obtained by combining one molecule of naphthaline-azo-naphthylamine, or sulpho-acids of the same, with one molecule of a tetrazo compound, and that these intermediate bodies can be converted into new and useful coloring-matters by reacting on them with another molecule of one of the naphthylamines or a sulpho-acid of the same.

The following are examples of how I carry out my process practically:

*Example* 1.—Twenty-five pounds of naphthionate of soda are dissolved in fifty gallons of water, and thirty pounds of muriatic acid, 22° Baumé, are added. The precipitated free naphthionic acid is cooled with ice, and seven pounds of nitrite of soda, dissolved in five times its weight of water, are run very slowly in. When the azotization is complete, twenty-five pounds more naphthionate of soda dissolved in twenty gallons of water are added, and then fifteen pounds of acetate of soda. The mixture is stirred until the molecule of free naphthionic acid is combined with the molecule of azo-naphthaline sulpho-acid. The reaction is complete when the whole product is transformed into a clear, bright, scarlet solution. The alpha-naphthaline sulpho-acid azo-alpha-naphthylamine sulpho-acid thus produced (which is a wool dye-stuff in itself) is allowed to react in presence of acetate of soda on the tetrazoditolyl formed in the usual manner by diazotizing thirty-two pounds of tolidine sulphate, or its equivalent of the base, with fourteen pounds of nitrite of soda. As soon as the tetrazo compound is all combined, twenty-five pounds of naphthionate of soda, dissolved in about sixty gallons of water, are added. The color is formed very slowly, and should be stirred for several days. The completion of the reaction is ascertained when dye-tests show no improvement. The temperature is then raised to boiling-point, and enough soda-lye added to convert the color into its soda salt. It is then precipitated with common salt, filtered off, pressed, and dried. The color dyes unmordanted cotton a bright red in an alkaline or soap bath, and is fast to washing. The shade is similar to that of the color commercially known as "benzo-purpurine 4. B.," and has the following formula:

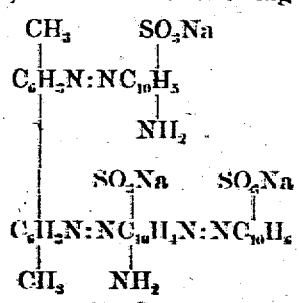

If the azo-naphthaline sulpho-acid is combined with the naphthionic acid (to produce the before-mentioned alpha-naphthaline monosulpho-acid azo-alpha-naphthylamine monosulpho-acid) in presence of caustic soda, instead of acetate of soda, a similar body is obtained.

*Example* 2.—The intermediate product produced in the same manner as given in Example 1 is reacted upon with twenty-five pounds of beta-naphthylamine monosulpho-acid soda salt in the place of the naphthionic acid.

By tetrazo bodies I mean the following: tetrazo-diphenyl and its homologues, tetrazo-naphthaline, tetrazo-stilbene, tetrazo-fluorine, tetrazo-diphenolether, tetrazo-benzole and its homologues, tetrazo-oxydiphenyl, as well as the alkylized compounds, or the carbo or sulpho acids of the same.

This coloring-matter appears as a brick-red powder, soluble in cold water, but much more soluble in hot water; soluble in concentrated acid, from which it is precipitated by water. The dyed fiber turns blue upon the addition of sulphuric acid, and brown upon the addition of acetic acid.

Having now described my invention, what I claim, and desire to secure by Letters Patent, is—

1. The herein-described process for the production of new azo coloring-matters, which process consists in combining one molecule of one of the herein-mentioned tetrazo compounds with one molecule of the herein-described naphthaline-azo-naphthylamine or its sulpho compounds, and afterward acting on the intermediate body thus formed with one molecule of one of the naphthylamines or sulpho-acids of the same, substantially as set forth.

2. The process for producing new coloring-matters by reversing the process in claim 1, by combining the tetrazo body first with one molecule of one of the naphthylamines or sulpho-acids of the same, and then reacting on the intermediate thus produced with the herein-described naphthaline-azo-naphthylamine or sulpho-acids of the same, substantially as set forth.

3. The substantive azo dye-stuffs, produced as herein described, which are soluble in concentrated acids with a blue color, are precipitated from this solution by the addition of water, are soluble in alkalies, and which have the property of dyeing unmordanted cotton a bright red color in an alkaline or soap bath, substantially as set forth.

RUPERT GREVILLE-WILLIAMS.

Witnesses:
HENRY H. LEIGH,
22 *Southampton Bdgs., London.*
JOSEPH LAKE,
17 *Gracechurch Street, London.*